United States Patent [19]
Kent et al.

[11] 3,964,949
[45] June 22, 1976

[54] METHOD OF TREADING TIRES

[75] Inventors: Peter Jan Kent; John Eric Phillips, both of Alton, England; Jan Herbert Farquharson Kent, St. Martin, Guernsey (Channel Is.)

[73] Assignee: Kentredder Limited, St. Saviour, Guernsey (Channel Is.)

[22] Filed: Aug. 30, 1974

[21] Appl. No.: 501,858

[30] Foreign Application Priority Data
Sept. 7, 1973 United Kingdom............... 42208/73

[52] U.S. Cl................................. 156/96; 156/123; 156/128 R; 264/36; 264/326; 425/37
[51] Int. Cl.²..................... B29H 5/04; B29H 17/36; B29H 17/37
[58] Field of Search............. 156/96, 110 R, 123 R, 156/126, 127, 128 R, 129, 394 R, 394 FM; 264/36, 315, 316, 326, DIG. 74; 425/37

[56] References Cited
UNITED STATES PATENTS

| | | | |
|---|---|---|---|
| 1,666,883 | 4/1928 | Lambert | 156/128 R |
| 1,679,560 | 8/1928 | Burdette | 156/96 |
| 2,110,293 | 3/1938 | Fisher | 156/96 |
| 2,282,578 | 5/1942 | Hawkinson | 156/96 |
| 2,611,411 | 9/1952 | Rawls | 156/95 |
| 2,976,910 | 3/1961 | Nowak | 156/96 |
| 3,143,450 | 8/1964 | Barber et al. | 156/129 |
| 3,283,795 | 11/1966 | Schelkmann | 156/96 |
| 3,464,873 | 9/1969 | Hawkinson | 156/96 |
| 3,713,929 | 1/1973 | Bottasso et al. | 156/127 |
| 3,809,592 | 5/1974 | Dennis et al. | 156/123 |

FOREIGN PATENTS OR APPLICATIONS
1,213,574   11/1970   United Kingdom................ 156/128

OTHER PUBLICATIONS
*Hawkinson Treads,* Hawkinson Tire Tread Service Inc., Minneapolis, Minn. Copyright 1940.

*Primary Examiner*—Douglas J. Drummond
*Assistant Examiner*—John E. Kittle
*Attorney, Agent, or Firm*—Baldwin, Wight & Brown

[57] ABSTRACT

A method of treading or re-treading tires involves compression of the wearing surface of the tread. A tread strip, which may be an annular band, is compressed in a direction parallel to its longitudinal axis and is bonded to a tire carcass, while being maintained under compression. This may be done by compressing a tread band into an undersized mould; apparatus for assisting this is also described. Alternatively, the tread strip may be of finite length, for example to form a lug, in which case the strip is formed with a radius of curvature less that of the surface to which it is to be applied, so that the convex (wearing) surface of the strip is compressed upon application to the carcass.

22 Claims, 11 Drawing Figures

METHOD OF TREADING TIRES

This invention relates to applying a tread to a tire, for example a pneumatic tire, either for retreading used tires or for applying the treads of new tires.

The terms tread and tire are used generically herein to mean the wearing surface and the body or carcass of a natural or synthetic rubber tire assembly, respectively.

It is known to make or retread a tire assembly by preparing a tread band in a mould to give the desired tread pattern and then to apply the tread band onto a prepared (e.g. buffed and trued) tire carcass. The tread band may be vulcanised before being applied to the carcass. A bonding material, such as unvulcanised rubber, may be interposed between the carcass and the tread band, and pressure and/or heat may be applied to set the bonding material and unite the tread band with the tire carcass. The pressure may be applied in various ways; for example an air bag may be placed with the tire carcass and may be inflated to press the carcass outwardly against the tread band while the latter is held in a mould. It is also known to sandwich the tire carcass and tread band assembly between two air bags in a relatively large mould and then inflate these bags to press the tread band and tire carcass against each other (this method is particularly applicable to radial ply tires). Co-pending British applications No. 34080/71 and No. 48368/71 describe such prior methods.

The object of the present invention is to provide a new method and apparatus for applying a tread band to a tire carcass which results in the production of a tire having improved performance, especially improved wearing performance resulting in a longer life.

The invention provides a method of applying a tread to a tire carcass by placing a pre-formed tread in strip form on the carcass, compressing at least the wearing surface of the tread in a direction parallel to the longitudinal axis of the strip and bonding the tread to the carcass, the compression being maintained while the tread is bonded to the carcass, whereby the wearing surface of the final assembly remains under compression.

The compression is preferably such that the periphery of the wearing surface is shortened by at least 0.5%, and preferably by 1% to 10%, more preferably by 1% to 6%.

The tread band may be formed of any conventional material used for making tires, such as natural or synthetic rubber (including plastics material such as polyurethane). When it is of rubber, it is important that it should be vulcanised before being applied to the carcass, as this is necessary for the optimum improvements in the wearing properties of the products of the present invention.

The tread strip may for example be prepared as an annular band made in a mould whose radius is such that the annular band is slightly too big for the carcass. In accordance with the present invention, the annular band is then compressed and is bonded onto the carcass while being maintained in its compressed state. In one preferred embodiment, the annular band is coated on its inner surface with a solution of bonding agent (for example an uncured rubber) and a thin layer of cushion rubber is interposed between it and the carcass to which has been applied an appropriate bonding agent; pressure is then applied to force the annular band against the carcass while reducing the radius of the annular band, resulting in compression of the tread band.

A form of fluid pressure may be used to apply the tread band to the carcass; for example the assembled tread and carcass may be surrounded by an inflatable vessel (such as an air bag) itself surrounded by a rigid frame, so that the pressure applied to the assembly may be controlled by controlling the degree of inflation. Alternatively, a clip of the "Jubilee" type may be used to compress the tread band onto the carcass.

It is also possible for the tread band, along with the cushion rubber strip if desired, to be bonded (while under compression) to an inextensible breaker strip so that the tread is maintained in compression; the combined tread/breaker strip is then applied to the carcass.

In another preferred method, where a pre-formed annular tread band is used, it may be formed in the usual manner in a mould, and it may then be compressed into another mould having a smaller diameter than the first mould, being held in the other mould while the carcass is applied to it and while bonding is effected. This method is for example particularly suitable for retreading radial ply or bias-belted tires, as it does not require extension of the tire carcass, which extension is difficult or impossible to effect with such tires. Again, it is possible to use an adjustable mould whose radius may be decreased, for example by mechanical means.

In an alternative method, a strip of tread band material may be used instead of a pre-formed annular band. The strip is moulded as a curved strip having a radius of curvature less than that of the carcass. As a result, when the strip is fitted onto the carcass, its outer or wearing surface is compressed relative to the inner or bonding surface. In this case, it is desirable to form the strip so that it includes an inextensible reinforcing strip along or near its inner surface so that, when the strip is fitted onto the carcass, the bonding surface of the strip is not under tension.

This method may also be used when a tire, e.g. an agricultural tire is treaded with lugs. In this case, a lug to be applied to a particular part of a tire carcass surface is formed with a radius of curvature less than that of the surface to which it is to be applied. Again, it is desirable to incorporate a reinforcing strip adjacent the bonding surface of the lug.

When an annular tread band is to be fitted to a tire carcass in accordance with the present invention, the tread band can be inserted into an annular mould of smaller radius (as mentioned above) and the tire carcass is then inserted within the tread band. This can be done by spreading apart the beads of the tire carcass so that is circumference is reduced. However, it has been found in practice, especially with radial tires, that the spreading apart of the beads has a tendency to cause the formation of a single large inward fold or crinkle in the carcass, and this is difficult to remove once the tire is in the mould and it may lead to a defective final product if allowed to persist throughout the curing operation. A similar problem can occur, although to a lesser extent, when the tread band is compressed into the mould of smaller diameter; in this case, if an inward crinkle or fold occurs, then it is difficult to achieve an even compression.

The present invention provides an apparatus which avoids this tendency to form an inward deformation and which can be adapted to give even compression of a tread band in a mould.

The present invention provides apparatus comprising a tire mould having an inner annular surface for holding a tread band, in which means are provided at spaced intervals around the circumference of the mould for preventing a tire carcass or a tread band inserted into the mould from touching the said inner surface at the places where such means are located, the said means being removable after the tire carcass or tread band has been placed in the mould so that the tire carcass or tread band can then accurately bear against the whole of the inner annular surface of the mould.

The said means may comprise a series of pairs (for example, six pairs) of holes at equal intervals through the side walls of the mould and corresponding rods slidable through each pair of holes so that the rods are spaced from the inner annular surface of the mould. With the rods in place in the corresponding pairs of holes, the tread band is placed in the mould and is induced to form small inward crinkles (for example, six) rather than a single large crinkle; the rods are then withdrawn and the small crinkles are readily accommodated by even compression of the tread band.

More important, after the tread band has thus been placed in the mould, the rods may again be inserted through the corresponding pairs of holes and the tire carcass may then be introduced into the mould where it also forms a corresponding number (for example six) of small inward crinkles which, after withdrawal of the rods, are readily accommodated. By this, a complete contact of the bonding surfaces of the tread band and the tire carcass may be achieved.

In the method of the invention (whether or not the special apparatus just described is used), the bonding of a tire tread to a wheel or carcass may be effected with the application of heat. The pressure assembly, including the tread and the carcass, may be placed in a heated chamber. If a metal mould is being used, heat may be applied directly to it so as to be conducted to the bonding surface.

Generally in the present invention, the periphery of the tread band is reduced by at least 0.5%, preferably 1 – 10%, by the compression applied to it in accordance with the invention.

The important thing in the present invention is for the wearing surface of the tread to be under compression. This is usually most easily achieved by placing the whole thickness of the tread band under compression, but this is not essential, especially if the tread band is of substantial thickness. It is the wearing surface (the surface which meets the road surface) which must be under the specified compression.

The invention will now be described with reference to the accompanying schematic drawings, in which.

Figure 1:
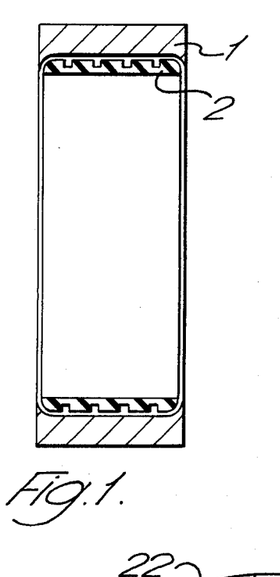
FIG. 1 is a section of a mould with a compressed, pre-vulcanised tread band in position.

Referring to FIG. 1, a tire carcass which is to be treaded is buffed down to the correct size for a plain ring mould 1. A pre-vulcanised tread band 2 is then prepared whose periphery is about 2% longer than the periphery of the mould 1. The pre-vulcanised tread band 2 is then placed in the mould as seen in FIG. 1 so that it is in even compression throughout. The oversize tread band 2 may be more easily compressed into the mould 1 if a silicone rubber lubricant is spread around the surface of the mould 1.

In the remainder of the procedure (not illustrated) a layer of bonding material, with or without cement, is applied to the buffed surface of the carcass or to the inside of the tread band 2 (preferably the former) and the beads of the tire are spread apart in order to reduce its diameter and allow its insertion into the mould inside the tread band 2. On release of the beads, the prepared bonding surfaces are brought into contact and heat and pressure are applied to secure the bond. This method is applicable to cross-ply, radial or bias-belted tires.

Figure 2:
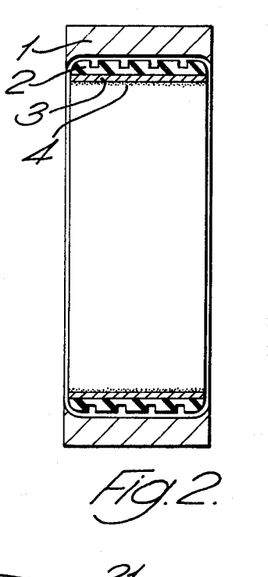
FIG. 2 is a section of a mould with a tread band and a breaker strip in place ready to receive a tire carcass.

A very similar method may be employed when it is desired to incorporate a breaker strip. Referring to FIG. 2, the tread band 2 is similarly compressed into a mould 1, and then an inextensible breaker strip 3 is bonded to the tread band. The breaker strip 3 will ensure that the tread band 2 will be maintained under compression. A layer of bonding material 4 is then applied to the breaker strip 3, and a tire carcass is then inserted into the mould 1. In this case, the buffed tire carcass has the same diameter as the breaker strip 3. If this method is used with a cross-ply tire, the tire is converted into a bias-belted tire.

In the methods of both FIGS. 1 and 2, pressure may for example be applied to assist bonding by means of an air-bag inflated within the tire carcass in the mould, and heat may be applied by placing the entire mould in an oven or by using a mould having internal heating elements.

When superimposing the prepared tire on to the compressed tread band, there may be a risk of trapping air between the two. This can be guarded against by providing blow holes through the thinner parts of the vulcanised tread through which air can escape.

Figure 4:
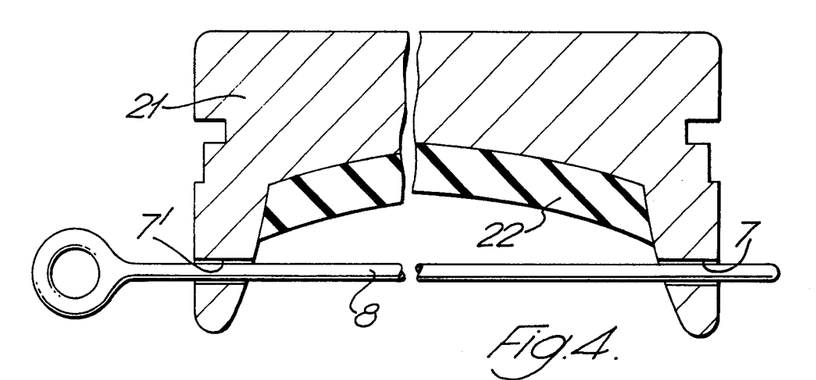
FIG. 4 is a cross-section of a mould provided with means for facilitating the insertion of a radial ply tire.

Referring to FIG. 4, an annular mould 21 is channel-shaped to receive a tread band 22. The side walls of the mould project beyond the tread band 22 and include a series of pairs of holes 7, 7' spaced around the circumference. A rod 8 is received in each pair of holes 7, 7' and extends through the mould at a spaced distance from the inner (tread-receiving) wall of the mould.

Figure 3:
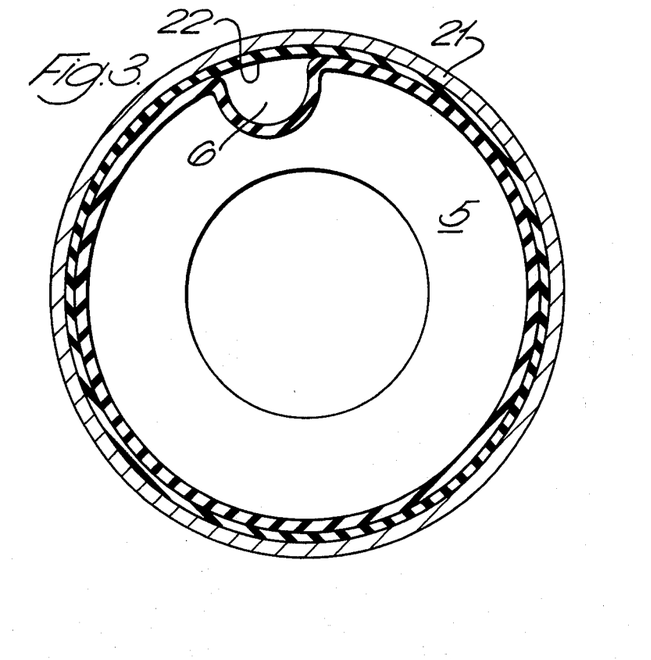
FIG. 3 is a section of a conventional mould containing a tread and a radial-ply tire.

Referring to FIG. 3, the mould 21 carrying a tread band 22, but not having the rods 8 in place, has received a radial-ply tire carcass 5. A large inward crinkle 6 has formed in the tire carcass 5; this crinkle is very difficult to remove, and will cause an area of weakness in the finished tire.

Figure 5:
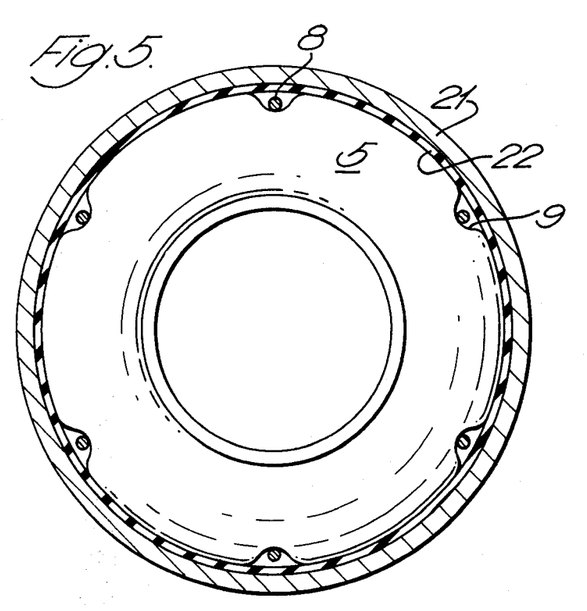
FIGS. 5 and 6 are sections of the mould of FIG. 4 showing a radial-ply tire being inserted.
Figure 6:
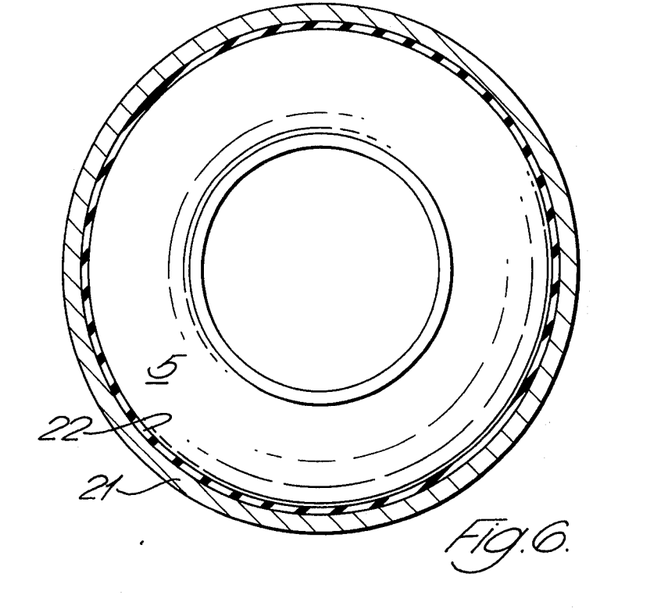

Referring to FIGS. 5 and 6, a generally similar mould 21 carries a tread band 22 but with six rods 8 in place.

The tire carcass 5, which has been placed in the mould 21 with the rods 8 in place, has been induced to form six small crinkles 9 instead of a single large crinkle. When the rods 8 are removed (FIG. 6) the small crinkles are easily accommodated in the mould and disappear, and a good seal of tread band 22 to carcass 5 is now possible.

Figure 10:
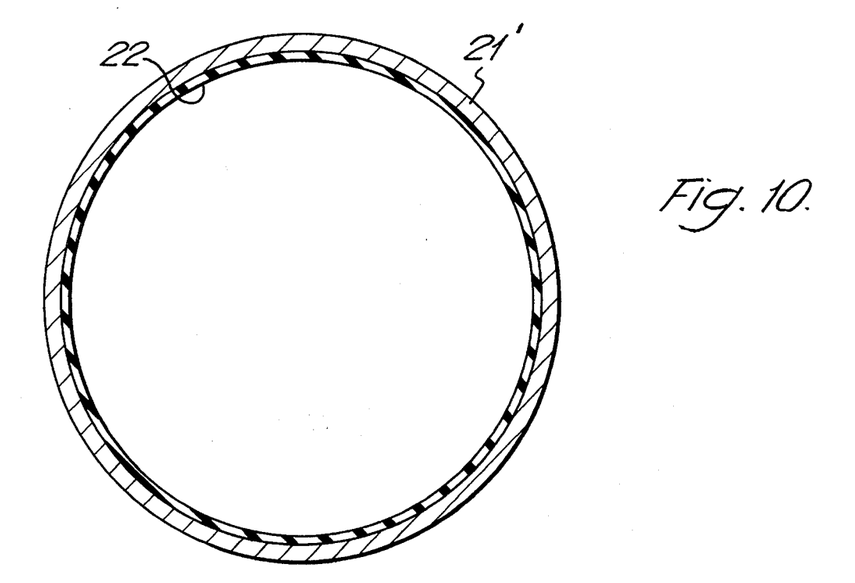
FIG. 10 is a schematic sectional view showing a tread being initially shaped in a first mould.
Figure 11:
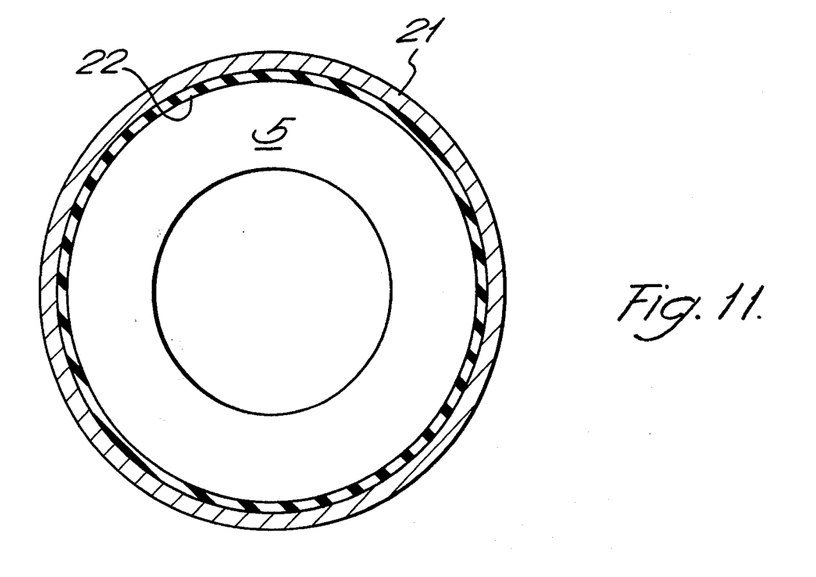
FIG. 11 is a schematic sectional view similar to FIG. 10 showing the tread of FIG. 10 compressed in a smaller mould.

Referring now to FIGS. 10 and 11, it will be seen that the tread 22 is first formed in a mould 21' of a diameter to form a tread band 22 of the desired oversize. The tread band 22 is then transferred from the mould 21' to the aforedescribed mould 21 which is of a smaller internal diameter than the mould 21' with the result that the tread band is compressed and will remain compressed at the time the carcass 5 is inserted therein.

Figure 7:
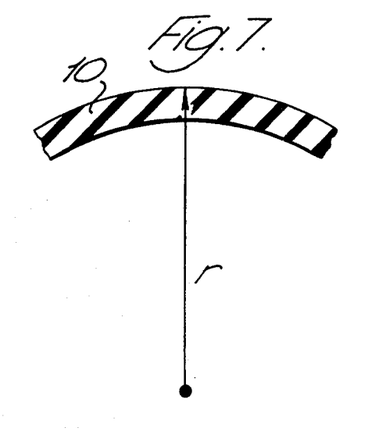
FIG. 7 is a part cross-section of a tire carcass suitable for a tire of an agricultural vehicle.
Figure 8:
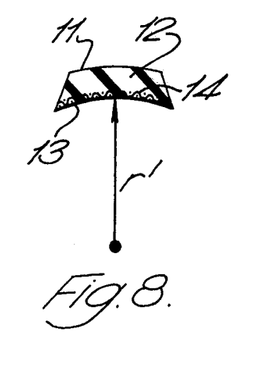
FIG. 8 is a cross-section of a lug for application to the carcass of FIG. 7.

Referring now to FIG. 7, there is shown a section of a tire carcass 10 suitable for an agricultural vehicle. The radius of curvature of the outer surface of this section of carcass is $r$. FIG. 8 shows a lug 12 to be fitted to this section of tire. The lug comprises a pre-vulcanised rubber strip having a radius of curvature $r^1$, where $r^1$, is less than $r$. The wearing surface of the lug is indicated at 11 and adjacent the other surface 13 there is provided reinforcement 14 (e.g. a wire mesh) in the rubber which makes the lug inextensible at that point.

The lug 12 is fitted over the tire section 10 and as its radius of curvature is increased, the wearing surface of the lug is brought under compression.

Figure 9:
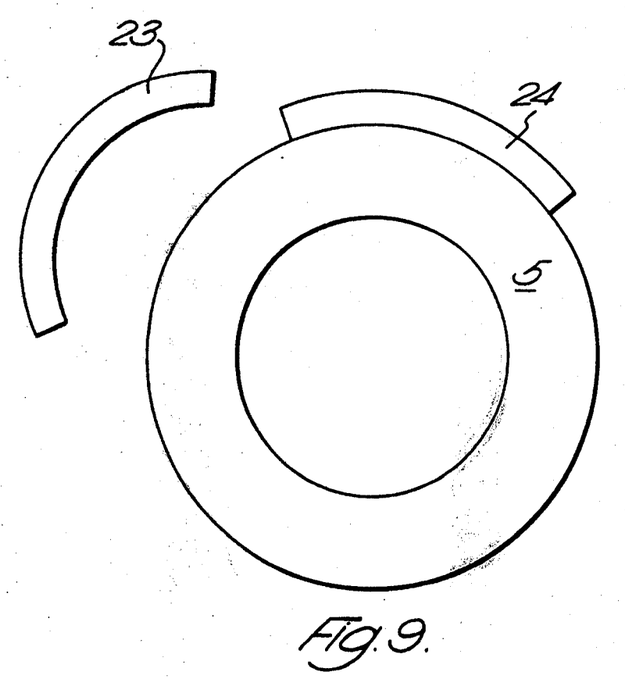
FIG. 9 is an elevation of a tire having tread applied in segments.

FIG. 9 shows a tire carcass 5 being treaded in a segmental fashion, for example as described in our co-pending Application No. 34395/73. A number of strips, for example four, are prepared for application to the crown of the carcass so that together they form a complete tread which may, for certain purposes have a smooth wearing surface. A strip 23 (FIG. 9) is moulded with a radius of curvature less than that of the tire so that the strip, strip 24 in the FIG., has a compressed wearing surface.

It has subsequently been found that by means of the present invention the life of a tire is made much greater than if the treading were carried out in the conventional way. Thus, pneumatic tires retreaded in accordance with the present invention have given much longer services than tires similarly retreaded without compression of the tread surface and have even given longer service than new tires made in the conventional way.

What is claimed is:

1. A method of applying a tread to a tire carcass comprising the steps of providing a prevulcanized tread in strip form, placing the tread on the carcass with at least the wearing surface of the tread in a direction parallel to the longitudinal axis of the strip being shortened with there being a compressive stress in the tread longitudinally axially of the strip, and then bonding the compressed tread to the relatively uncompressed carcass while maintaining the compressive stress in the tread with the compressive stress remaining in the tread after it is bonded to the carcass so that the wearing surface of the final assembly remains under compressive stress.

2. The method of claim 1 in which the compression is such that the wearing surface of the tread is shortened before the bonding step by at least 0.5%.

3. The method of claim 2 in which the wearing surface is shortened by from 1% to 10%.

4. The method of claim 3 in which the surface is shortened by 1% to 6%.

5. The method of claim 1 in which the pre-formed tread strip is in the form of an annular band.

6. The method of claim 5 including the additional steps of coating the inner surface of the annular band and the outer surface of the carcass with a bonding material, interposing a layer of cushion rubber between the annular band and the carcass, and applying pressure to the wearing surface of the tread to force the annular band against the carcass while reducing the radius of the annular band resulting in compression of the tread band.

7. The method of claim 6 in which the compression is such that the wearing surface of the tread is shortened before the bonding step by from 1% to 10%.

8. The method of claim 7 in which the surface is shortened by from 1% to 6%.

9. The method of claim 5 comprising coating the inner surface of the annular band with a bonding material and bonding the annular band, while under compression, to an inextensible breaker strip, the combined tread and breaker strip then being bonded to the carcass.

10. The method of claim 9 in which the compression is such that the wearing surface of the tread is shortened before the bonding step by from 1% to 10%.

11. The method of claim 5 in which the annular band is formed in a mould of a certain diameter and is then compressed into another mould of a smaller diameter than the first mould, said annular band being held in the other mould while said bonding of the tread to the carcass is effected.

12. The method of claim 8, in which the annular band is formed in a mould of a certain diameter and is then compressed into another mould of a smaller diameter than the first mould, and said annular band is held in the other mould while said bonding of the tread to the carcass is effected.

13. A method of applying a tread to a tire carcass comprising the steps of providing a prevulcanized tread including an outer wearing surface, and an inner concave surface, said prevulcanized tread being in the form of a curved strip having a radius of curvature less than the like radius of curvature of the carcass surface to which the prevulcanized tread is to be applied, reshaping the curvature of the prevulcanized tread to increase the radius of curvature of said inner surface and thereby shortening the outer wearing surface in the direction of curvature with there being a compressive stress introduced in the outer wearing surface and then bonding the inner concave surface of the reshaped prevulcanized tread to the carcass while maintaining the compressive stress in the outer wearing surface with the compressive stress remaining in the tread after it is bonded to the carcass so that the wearing surface of the final assembly remains under compressive stress.

14. The method of claim 13 in which the compression is such that the wearing surface of the tread is shortened before the bonding step by from 1% to 10%.

15. The method of claim 14 in which the prevulcanized tread is formed so as to include an inextensible reinforcing strip along or adjacent its concave surface so that, when the prevulcanized tread is fitted on to the carcass, the bonding surface of the prevulcanized tread is not under tension.

16. The method of claim 14 in which the curvature of said prevulcanized tread is in a direction parallel to the circumference of the carcass.

17. The method of claim 16 in which a plurality of prevulcanized treads are applied around the tire carcass circumferentially adjacent one to another to form a complete tread.

18. The method of claim 14 in which the curvature of said prevulcanized tread is in a direction transverse to the midcircumferential axis of the carcass.

19. The method of claim 17 in which each prevulcanized tread has a smooth wearing surface.

20. The method of claim 1 wherein the tread is applied to a tire carcass in a tire mould having an innter annular surface for holding the tread, prior to the insertion of the carcass into the mould providing at spaced intervals around the circumference of the mould means preventing the carcass inserted into the mould from touching the inner annular surface of the tread at the places where such means are located, inserting the carcass in the mould, and then removing the means so that the carcass can accurately bear against the whole of the inner annular surface of the tread.

21. The method of claim 20 wherein providing of the means includes forming a series of pairs of holes at spaced intervals through the side walls of the mould and sliding a rod through each pair of holes with the rods being spaced from the inner annular surface of the mould.

22. The method of claim 1 wherein the tread in its compressed state has a predetermined inner diameter, and the carcass is prepared to have an outer diameter of the correct size for the tread.

* * * * *

UNITED STATES PATENT AND TRADEMARK OFFICE
CERTIFICATE OF CORRECTION

PATENT NO. : 3,964,949
DATED : June 22, 1976
INVENTOR(S) : Peter Jan Kent, et al It is certified that error appears in the above-identified patent and that said Letters Patent are hereby corrected as shown below:

In the patent heading, the address of the inventor Jan Herbert Farquharson Kent, and the address of the assignee Kentredder Limited should read --St. Saviour, Jersey British (Channel Is.) -- instead of "St Saviour, Guernsey (Channel Is.)".

Signed and Sealed this

Twenty-first Day of September 1976

[SEAL]

Attest:

RUTH C. MASON
Attesting Officer

C. MARSHALL DANN
Commissioner of Patents and Trademarks